US009075808B2

(12) United States Patent
Wässingbo et al.

(10) Patent No.: US 9,075,808 B2
(45) Date of Patent: Jul. 7, 2015

(54) DIGITAL PHOTOGRAPH CONTENT INFORMATION SERVICE

(75) Inventors: Tomas Karl-Axel Wässingbo, Lund (SE); Gunnar Klinghult, Lund (SE); Johan F. Gulliksson, Lund (SE); Eral Denis Foxenland, Malmö (SE); Randi-Lise Hjelmeland Almås, Malmö (SE); Anna-Maria Lagerstedt, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 918 days.

(21) Appl. No.: 11/692,944

(22) Filed: Mar. 29, 2007

(65) Prior Publication Data

US 2008/0243861 A1 Oct. 2, 2008

(51) Int. Cl.
*G06F 7/00* (2006.01)
*G06F 17/30* (2006.01)

(52) U.S. Cl.
CPC .... *G06F 17/30047* (2013.01); *G06F 17/30244* (2013.01)

(58) Field of Classification Search
CPC .................................................. G06F 17/30244
USPC ................. 707/104.1, 100, 10, 736
See application file for complete search history.

(56) References Cited

U.S. PATENT DOCUMENTS 6,161,108 A * 12/2000 Ukigawa et al. .................... 1/1
6,779,178 B1 * 8/2004 Lloyd et al. .................... 717/174

(Continued)

FOREIGN PATENT DOCUMENTS

| EP | 0 944 019 | 9/1999 |
| EP | 1710717 | 1/2005 |
| EP | 1 710 717 | 10/2006 |
| JP | 11-296674 | 10/1999 |
| JP | 2002-169823 | 6/2002 |

(Continued)

OTHER PUBLICATIONS

International Search Report, corresponding to PCT/IB2009/006439, mailed on Nov. 12, 2009.

(Continued)

*Primary Examiner* — Hosain Alam
*Assistant Examiner* — Eliyah S Harper
(74) *Attorney, Agent, or Firm* — Renner, Otto, Boiselle & Sklar

(57) ABSTRACT

A server provides an information record comprising selected information related to an image depicted in a digital photograph. The server may comprise a database and a recognition application. The database may store, in association with each of a plurality of subject matters: i) recognition data for recognizing the subject matter within an image; and ii) information related to the subject matter. The recognition application may receive a request from a remote client system. The request comprises a digital image embodying at least a portion of a digital photograph. The recognition application applies recognition data to the digital image to determine a selected subject matter. The selected subject matter is the subject matter depicted in the digital image. The recognition application further obtains selected information from the database. The selected information may be the information related to the selected subject matter. A response is then returned to the remote client system. The response comprises the information record comprising the selected information.

26 Claims, 11 Drawing Sheets

(56) References Cited

U.S. PATENT DOCUMENTS

| | | | |
|---|---|---|---|
| 7,096,426 B1* | 8/2006 | Lin-Hendel | 715/711 |
| 2001/0046330 A1* | 11/2001 | Shaffer et al. | 382/284 |
| 2002/0140843 A1 | 10/2002 | Tretter et al. | |
| 2004/0207722 A1 | 10/2004 | Koyama et al. | |
| 2006/0018542 A1* | 1/2006 | Shuster | 382/181 |
| 2006/0140455 A1* | 6/2006 | Costache et al. | 382/118 |
| 2006/0251339 A1* | 11/2006 | Gokturk et al. | 382/305 |
| 2007/0053335 A1 | 3/2007 | Onyon et al. | |
| 2007/0067295 A1* | 3/2007 | Parulski et al. | 707/7 |
| 2007/0168382 A1* | 7/2007 | Tillberg et al. | 707/102 |
| 2008/0033983 A1* | 2/2008 | Ko | 707/102 |
| 2008/0153465 A1* | 6/2008 | Evermann et al. | 455/414.1 |
| 2008/0208851 A1* | 8/2008 | Briggs et al. | 707/6 |

FOREIGN PATENT DOCUMENTS

| | | |
|---|---|---|
| JP | 2005-215922 | 8/2005 |
| WO | 03/073304 | 9/2003 |
| WO | 2004/038613 | 5/2004 |
| WO | 2004/049130 | 6/2004 |
| WO | 2004/066613 | 8/2004 |
| WO | 2005/076149 | 8/2005 |
| WO | 2005/114476 | 12/2005 |
| WO | 2007/144692 | 12/2007 |

OTHER PUBLICATIONS

Written Opinion of the International Searching Authority, corresponding to PCT/IB2009/006439, mailed Nov. 12, 2009.

Al-Baker O; Benlamri R; Al-Qayedi A: "A GPRS-based remote human face identification system for handheld devices" Wireless and Optical Communications Networks, 2005. WOCN 2005., Mar. 6, 2005, pp. 367-371, XP002553181 Piscataway, NJ, USA.

Joonhyun Bae et al: "A Mobile Peer-to-Peer Query in a Social Network" Advanced Language Processing and Web Information Technology, 2008. ALPIT '08. International Conference on, IEEE, Piscataway, NJ, USA, Jul. 23, 2008, pp. 450-453, XP031294433 ISBN: 978-0-7695-3273-8.

Andreas Girgensohn et al.; "Leveraging Face Recognition Technology to Find and Organize Photos"; FX Palo Alto Laboratory; Palo Alto, CA, USA.

International Search Report and Written Opinion for corresponding application No. PCT/IB2007/002854 dated Aug. 12, 2008.

Written Opinion of the International Preliminary Examining Authority for Application No. PCT/IB2007/002854 mailed May 25, 2009.

International Preliminary Report on Patentability for Application No. PCT/IB2007/002854 mailed Jul. 30, 2009.

International Preliminary Report on Patentability for corresponding Application No. PCT/IB2007/002853 mailed Apr. 1, 2009.

International Search Report for corresponding Application No. PCT/IB2007/002853 mailed Jan. 22, 2008.

S. J. Brzezowski et al.; "Integrated Portable System for Identification and Tracking"; Proceedings of the SPIE, SPIE, Bellingham, VA, US, vol. 2935, Nov. 19, 2006, pp. 24-35, XP000957348.

* cited by examiner

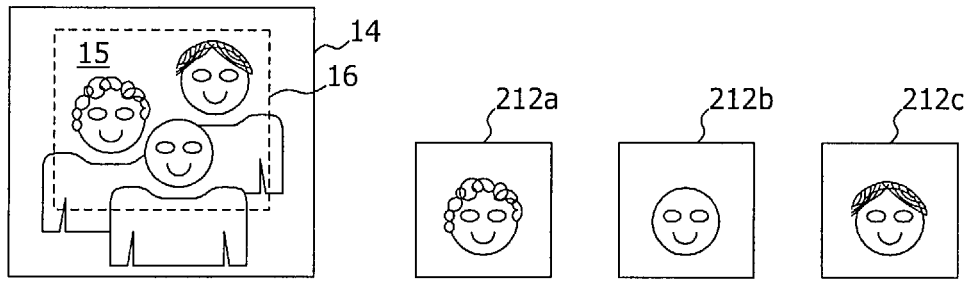

Figure 2a

```
        ⎡ <Date> 1-15-07 </Date> ~ 51
        │ <Time> 15:07 </Time> ~ 52
        │ ⎡<Location>
        │ │   <Country> United States </Country>
      53│ │   <City> Orlando </City>
        │ │   <Other ID> Disney </Other ID>
        │ ⎣</Location>
     47⎨ ⎡<Primary Content>
        │ │   <Category> People </Category> ~ 55
        │ │   <Person ID> Ann </Person ID> ~ 56a
        │ │      <Email> ann@url.com </Email>
      54│ │      . . .
        │ │   <Person ID> Bill </Person ID> ~ 56b
        │ │      <Email> bill@url.com </Email>
        │ │      . . .
        │ │   <Person ID> Unidentified </Person ID> ~ 56c
        ⎣ ⎣</Primary Content>
```

Figure 2b

```
                ┌ <Date> 1-15-07 </Date> ~ 51
                │ <Time> 15:07 </Time> ~ 52
                │   ┌ <Location>
                │   │    <Country> United States </Country>
                │ 53│    <City> Orlando </City>
                │   │    <Other ID> Disney </Other ID>
             47 │   └ </Location>
                │   ┌ <Primary Content>
                │   │    <Category> Dogs </Category> ~ 55
                │ 54│      ┌<Text>
                │   │    57│   Dog Info
                │   │      └</Text>
                └   └ </Primary Content>
```

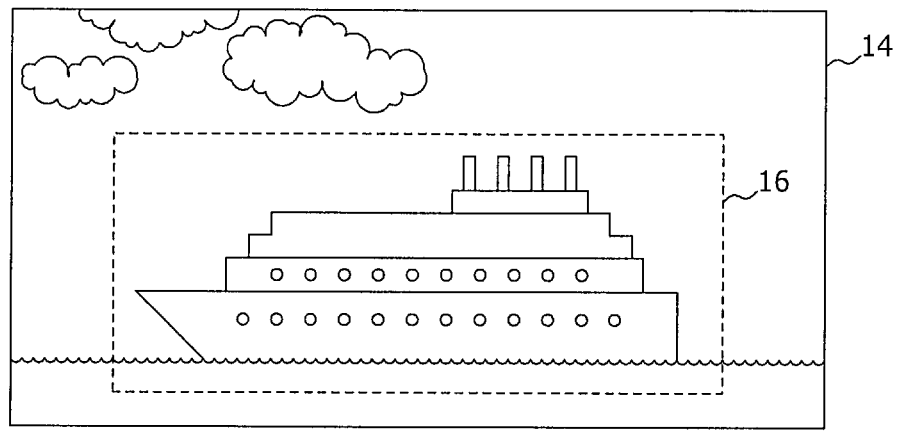

Figure 4a

```
            ⎡  <Date> 1-15-07 </Date> ~ 51
            ⎢  <Time> 15:07 </Time> ~ 52
            ⎢  ⎡ <Location>
            ⎢  ⎢    <Country> United States </Country>
         53 ⎨  ⎨    <City> Orlando </City>
            ⎢  ⎢    <Other ID> Disney </Other ID>
            ⎢  ⎣ </Location>
            ⎢  ⎡ <Primary Content>
       47 ⎨ ⎢  ⎢    <Category> Attraction </Category> ~ 55
            ⎢  ⎢    <Attraction Data>
            ⎢  ⎢       <Attraction ID> Pirates Ship </Attraction ID> ~ 218
            ⎢  ⎢       ⎡<Text>
         54 ⎨ 219 ⎨    ... facts ...
            ⎢  ⎢       ⎢ ... statistics ...
            ⎢  ⎢       ⎣ ... URL for more data ...
            ⎢  ⎢       ⎣</Text>
            ⎢  ⎢    </Attraction Data>
            ⎣  ⎣ </Primary Content>
```

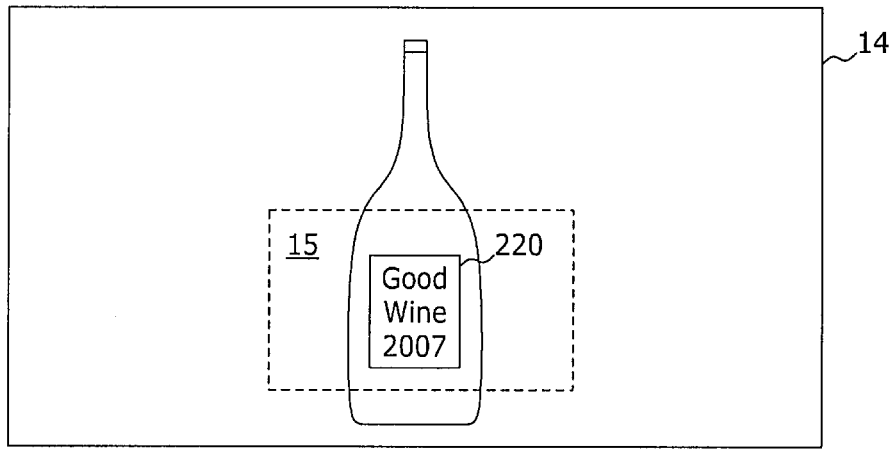

Figure 5a

```
                ┌ <Date> 1-15-07 </Date> ~ 51                                    44
                │ <Time> 15:07 </Time> ~ 52
                │ ┌ <Location>
                │ │    <Country> United States </Country>
                │53│   <City> Orlando </City>
                │ │    <Other ID> Disney </Other ID>
                │ └ </Location>
             47 ┤ ┌ <Primary Content>
                │ │    <Category> Wine Label </Category> ~ 55
                │ │  ┌<Vintage Data>
                │54│  │   <Vintage ID> Good Wine Merlot, 2007 </Vintage ID>
                │  221│  <Vinyard Location> Nappa, California </Vinyard Location>
                │ │  │   <Awards> Best California Red Wine </Awards>
                │ │  │   . . . Other Data . . .
                │ │  └</Vintage Data>
                └ └ </Primary Content>
```

Figure 5b

| Content Database 43 | |
|---|---|
| Category 238 | Content Recognition Data 45 |
| People | |
| Dogs | |
| Attractions | |
| Wine Labels | |

Figure 6

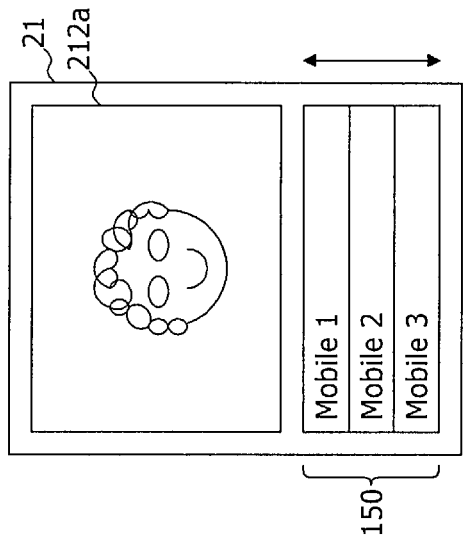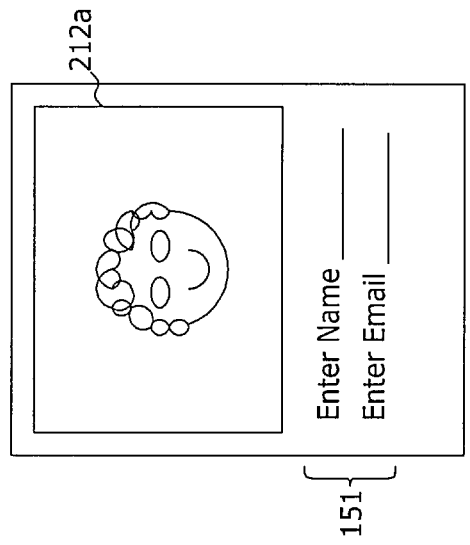
Figure 9a
Figure 9b
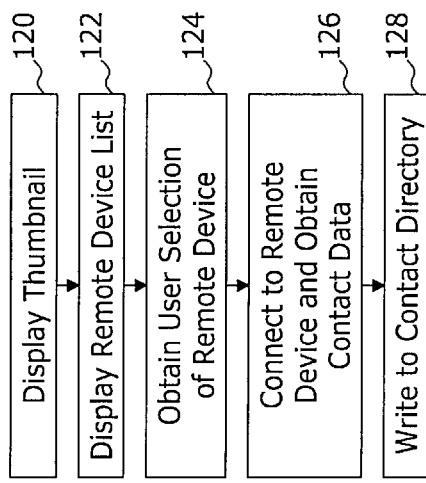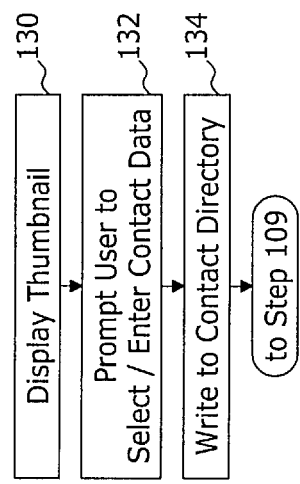
Figure 8a
Figure 8b

| ID Database (People) | | | | | | | |
|---|---|---|---|---|---|---|---|
| | | | Personal Information 248 | | | Photo 250 | Group |
| | Index | ID Data 246 | Name 248a | Email 248b | Tel. 248c | Etc. 248d | Sharing Indicator | Authorization 252 |
| | 1 | 🧒 | Ann | | | | No | |
| | 2 | 😊 | Bill | | | | Email | |
| | 3 | 😊 | Ted | | | | Email | |

| ID Database (Dogs) | | |
|---|---|---|
| Breed 268 | ID Data 269 | Descriptive Data 271 |
| 1 | | |
| 2 | | |
| 3 | | |

ID Database (Attraction) — 242c

| Predetermined Locations 256 |
|---|
| Disney, Orlando 256a |
| B |
| C |
| D |
| E |

| Attraction List 254 | | |
|---|---|---|
| Attraction ID 255 | Identification Data 258 | Descriptive Data 260 |
| Pirates Ship | 🚢 | |
| 2 | | |
| 3 | | |

Figure 11c

| ID Database (Label) | | |
|---|---|---|
| Vintage | Identification Data 264 | Descriptive Data 266 |
| 1 | | |
| 2 | | |
| 3 | | |
| 4 | | |

```
        ⎡  <Category ID> People </Category ID> ~ 55
        │ ⎡<Location>
        │ │   <Country> United States </Country>
        │ 53⎨   <City> Orlando </City>
        │ │   <Other ID> Disney </Other ID>
        │ ⎣</Location>
        │  <Person>
        │     <Person ID> Ann </Person ID> ~ 211
        │     <Email> ann@url.com </Email> ~ 212
        │     . . .
  217 ⎨     <Photo Sharing> email </Photo Sharing> ~ 213
        │  </Person>
        │  <Person>
        │     <Person ID> Bill </Person ID> ~ 211
        │     <Email> bill@url.com </Email> ~ 212
        │     . . .
        │     <Photo Sharing> no </Photo Sharing> ~ 213
        │  </Person>
        │  <Person>
        │     <Person ID> Unidentified </Person ID> ~ 215
        ⎣  </Person>
```

Figure 12a

```
         ⎡  <Category ID> Dogs </Category ID> ~ 55
         │ ⎡<Location>
         │ │   <Country> United States </Country>
         │ 53⎨   <City> Orlando </City>
  217 ⎨   │   <Other ID> Disney </Other ID>
         │ ⎣</Location>
         │ ⎡<Text>
         │ 57⎨   Dog Info
         ⎣ ⎣</Text>
```

Figure 12b

```
                                                                    209
      ┌   <Category ID> Attraction </Category ID> ~ 55
      │   ┌<Location>
      │   │   <Country> United States </Country>
      │ 53│   <City> Orlando </City>
      │   │   <Other ID> Disney </Other ID>
      │   └</Location>
      │   <Attraction Data>
  217 │      <Attraction ID> Pirates Ship </Attraction ID> ~ 218
      │   ┌<Text>
      │   │  . . . facts . . .
      │ 219  . . . statistics . . .
      │   │  . . . URL for more data . . .
      │   └</Text>
      └   </Attraction Data>
```

Figure 12c

```
                                                                    209
      ┌   <Category ID> Wine Label </Category ID> ~ 55
      │   ┌<Location>
      │   │   <Country> United States </Country>
      │ 53│   <City> Orlando </City>
      │   │   <Other ID> Disney </Other ID>
      │   └</Location>
  217 │   ┌<Vintage Data>
      │   │  <Vintage ID> Good Wine Merlot, 2007 </Vintage ID>
      │ 221  <Vinyard Location> Nappa, California </Vinyard Location>
      │   │  <Awards> Best California Red Wine </Awards>
      │   │  . . . Other Data . . .
      └   └</Vintage Data>
```

Figure 12d

DIGITAL PHOTOGRAPH CONTENT INFORMATION SERVICE

TECHNICAL FIELD OF THE INVENTION

The present invention relates to automated systems for providing information related to the contents of a digital photograph and, in particular, to automated systems for providing a service for providing information related to images depicted in a digital photograph.

DESCRIPTION OF THE RELATED ART

Use of digital photography has expanded significantly within the past few years. Advances in the quality of digital photography systems combined with decreasing costs of fabricating digital camera components have lead to wide spread use of digital cameras. Further, size reductions, combined with the quality advances and decreasing costs, have enabled integration of digital cameras into various portable electronic devices such as mobile telephones and personal data assistants (PDAs).

Unlike conventional film photography which has a cost of expended film associated with each picture taken, digital photography does not an incremental cost associated with each picture. Therefore, a user of a digital camera often captures many more photographs than he or she would have with a traditional film camera.

A challenge associated with capturing many digital photographs is organizing and managing the photographs (stored as files) in a manner such that a photograph (or group of photographs) can be readily located. One obvious approach to organizing and managing digital photographs is to organize the files within nested directories with file and directory names that are useful for identifying the image content of the photographs. While such a solution is useful, it is not optimal. Such a solution does not facilitate searching for, or locating, a digital photograph if the appropriate directory name and file name are not known.

Several providers of "photo-album" software applications facilitate organization of digital photographs. For example, Photoshop®, available from Adobe Systems®, enables a user to associate text based tags with each photograph. A search feature then enables searching based on such text. While this type of a solution facilitates searching, manually typing text to associate with each photograph can be time consuming and cumbersome.

It has been proposed to use face recognition technology to assist in associating text based tags with each photograph. In a paper entitled "Leveraging Face Recognition Technology to Find and Organize Photos", authored by Andreas Girgensohn, John Adcock, and Lynn Wilcox, published in 2004, the authors propose use of a face detector to automatically extract images of faces from photographs. The face images are then sorted by similarity to a chosen model. A user interface presents the sorted face images so that a user may assign the face images to a person (e.g. label the face images). The label assigned to a face image is associated with the photograph from which the face image is extracted. As the user labels extracted face images, the face images become the model for use sorting additional face images. One challenge with use of the above described face recognition technology is that recognition is limited to people for whom a model is available in the database.

What is needed is an improved system and method for organizing a collection of digital photographs by providing automated association of text based metadata with the digital photographs. In particular, what is needed is a system and method implemented as a network based service for providing automated association of text based metadata with a digital photograph without being limited to automated recognition based on data available in a database local to the device managing the collection of digital photographs.

SUMMARY

A first aspect of the present invention comprises a server for providing an information record comprising selected information related to an image depicted in a digital photograph. The server may comprise a database and a recognition application.

The database may store, in association with each of a plurality of subject matters: i) recognition data for recognizing the subject matter within an image; and ii) information related to the subject matter.

The recognition application may receive a request from a remote client system. The request comprises a digital image embodying at least a portion of a digital photograph. The recognition application applies recognition data to the digital image to determine a selected subject matter. The selected subject matter is the subject matter depicted in the digital image.

The recognition application further obtains selected information from the database. The selected information may be the information related to the selected subject matter. A response is then returned to the remote client system. The response comprises the information record comprising the selected information.

In a first embodiment, the database may comprise a person identification database. The person identification database associates, for each of a plurality of persons: i) identification data for recognizing an image of the person; and ii) personal information about the person. The personal information may comprise the person's name and the person's contact information such as email address, text messaging address, telephone number, URL of personal web site, etc.

In such embodiment, applying the recognition data to the digital image to determine a selected subject matter comprises comparing a facial image of the digital image with the identification data to identify a selected person. The selected person is one of the plurality of persons who's image is depicted within the digital image. Further, obtaining selected information from the database may comprise obtaining the personal information about the person.

In one sub-embodiment, the person identification database may further associate each of the plurality of persons with identification of a group authorized to receive the personal information about the person. In this sub-embodiment, the request may comprise authentication data identifying a source of the request and the server only returns the personal information associated with the selected person if the source of the request is within the group authorized to receive personal information about the selected person.

In yet another sub-embodiment, the person identification database may further associate each of the plurality of persons with a photograph sharing request indicator identifying whether the person desires to obtain a photograph in which he/she is depicted. In this sub-embodiment, the response further comprises the photograph sharing request indicator associated with the selected person. The personal information includes a network address to which the selected person desires the photograph in which he/she is depicted to be sent. Either the server or the remote client device may send the photograph to such network address.

In a second embodiment, the database may comprise an attraction database associating, for each of a plurality of locations: i) identification data for recognizing each of a plurality of attractions visible from the predetermined location; and ii) descriptive data about each of the plurality of attractions visible from the predetermined location. Attractions may include buildings, architectural or artistic structures, recognizable natural landscape features, or other attractions typically photographs and for which a photographer may desire information.

In this second embodiment, the request may further identify a photograph location (e.g. location at which the digital image was captured). Such identification may be by GPS coordinates.

Further, applying the recognition data to the digital image to determine a selected subject matter may comprise: i) determining a selected predetermined location wherein the selected predetermined location may be the predetermined location corresponding to the photograph location; and ii) comparing the digital image with identification data for the attractions visible from the selected predetermined location to determine a selected attraction. The selected attraction may be the one of the plurality of attractions visible from the predetermined location and depicted in the digital image.

Further yet, obtaining selected information from the database comprises obtaining descriptive data associated with the selected attraction. The descriptive data may identify the attraction, may identify the location of the attraction (in human recognizable terms such as country, state, city, street, region, or other identifiers such as Disney® Park), and may identify other facts, statistics, or other information about the attraction—or even a URL for additional information about the attraction.

In a third embodiment, the database may comprise a wine label database. The wine label database may associate each of a plurality of vintages of wine with: i) data for recognizing an image of a label associated with the vintage of wine; and ii) information about the vintage of wine.

In this third embodiment, applying the recognition data to the digital image to determine a selected subject matter may comprise comparing the digital image with data for recognizing an image of a label to identify a selected vintage. The selected vintage may be the one of the plurality of vintages associated with a label depicted in the digital image. The data about the subject matter includes the information about the selected vintage.

In a second aspect of the present invention, the database may comprise: i) a categorization level database associating each of a plurality of image categories with content recognition data for determining whether the digital image is within the image category; and ii) an identification level database associating, with each image category, subject matter within the image category with data about the subject matter.

In this aspect, applying recognition data to the digital image to determine selected subject matter may comprise comparing the digital image with the content recognition data to determine a selected image category. The selected image category may be the image category with content recognition data with which the digital image corresponds. The digital image is then compared with subject matter within the selected image category to determine a selected subject matter. The selected subject matter is the subject matter depicted in the digital image. Further, in this aspect obtaining selected information from the database comprises obtaining the data about the selected subject matter.

In a first embodiment of this second aspect, one of the image categories may be a people image category. In this first embodiment, the identification level database includes a person identification database associated with the people image category. The person identification database associates, for each of a plurality of persons, identification data for recognizing an image of the person with personal information about the person. The personal information may comprise the person's name and contact information.

Further, comparing the digital image with subject matter within the selected image category may comprise comparing a facial image of the digital image with the identification data of the person identification database to identify a selected person. The selected person is the one of the plurality of persons whose image is depicted within the digital image. The data about the selected subject matter includes the personal information associated with the selected person.

Again, in one sub-embodiment, the person identification database may further associate each of the plurality of persons with identification of a group authorized to receive the personal information about the person. In this sub-embodiment, the request may comprise authentication data identifying a source of the request and the server only returns the personal information associated with the selected person if the source of the request is within the group authorized to receive personal information about the selected person.

Again, in another sub-embodiment, the person identification database may further associate each of the plurality of persons with a photograph sharing request indicator identifying whether the person desires to obtain a photograph in which he/she is depicted. In this sub-embodiment, the response further comprises the photograph sharing request indicator associated with the selected person and the personal information includes a network address to which the selected person desires the photograph in which he/she is depicted to be sent. Either the server or the remote client device may send the photograph to such network address.

In a second embodiment of this second aspect, one of the image categories may be an attraction image category. In this second embodiment, the identification level database includes an attraction database associated with the attraction image category. The attraction database associates, for each of a plurality of predetermined locations: i) identification data for recognizing each of a plurality of attractions visible from the predetermined location; and ii) descriptive data about each of the plurality of attractions visible from the predetermined location.

In this second embodiment, the request may further identify a photograph location (e.g. the location at which the digital image was captured) for example by GPS coordinates.

Comparing the digital image with subject matter within the selected image category comprises: i) determining a selected predetermined location, the selected predetermined location being the predetermined location corresponding to the photograph location; and ii) comparing the digital image with identification data for the attractions visible from the selected predetermined location to determine a selected attraction. The selected attraction is the one of the plurality of attractions visible from the predetermined location which is depicted in digital image. The data about the selected subject matter includes descriptive data associated with the selected attraction.

In a third embodiment of this second aspect, one of the image categories may be a wine label image category. In this third embodiment, the identification level database includes a wine label database associated with the wine label image category. The wine label database associates each of a plurality of vintages of wine with: i) data for recognizing an image of a label associated with the vintage of wine; and ii) information about the vintage of wine.

Further, in this third embodiment, comparing the digital image with subject matter within the selected image category comprises comparing the digital image with data for recognizing an image of a label to identify a selected vintage. The selected vintage is the one of the plurality of vintages associated with a label with which the digital image corresponds. The data about the subject matter includes the information about the selected vintage.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

FIG. 2a is a diagram representing an exemplary digital photograph in accordance with one embodiment of the present invention;

FIG. 2b is a diagram representing an exemplary metadata record in accordance with one embodiment of the present invention;

FIG. 4a is a diagram representing an exemplary digital photograph in accordance with one embodiment of the present invention;

FIG. 4b is a diagram representing an exemplary metadata record in accordance with one embodiment of the present invention;

FIG. 5a is a diagram representing an exemplary digital photograph in accordance with one embodiment of the present invention;

FIG. 5b is a diagram representing an exemplary metadata record in accordance with one embodiment of the present invention;

FIG. 6 is a table depicting an exemplary content database in accordance with one embodiment of the present invention;

FIG. 8a is a flow chart diagram representing exemplary operation of a photograph management application in accordance with one embodiment of the present invention;

FIG. 8b is a flow chart diagram representing exemplary operation of a photograph management application in accordance with one embodiment of the present invention;

FIG. 9a is a diagram representing an exemplary user interface of an exemplary mobile device implementing a photograph management system in accordance with one embodiment of the present invention;

FIG. 9b is a diagram representing an exemplary user interface of an exemplary mobile device implementing a photograph management system in accordance with one embodiment of the present invention;

FIG. 11a depicts an exemplary identification database associated with the "people" category in accordance with one exemplary embodiment of the present invention;

FIG. 11b depicts an exemplary identification database associated with the "people" category in accordance with one exemplary embodiment of the present invention;

FIG. 11c depicts an exemplary identification database associated with the "attractions" category in accordance with one exemplary embodiment of the present invention;

FIG. 11d depicts an exemplary identification database associated with the "wine vintage" category in accordance with one exemplary embodiment of the present invention;

FIG. 12a depicts an exemplary response metadata structure associated with the "people" category in accordance with one exemplary embodiment of the present invention;

FIG. 12b depicts an exemplary response metadata structure associated with the "dogs" category in accordance with one exemplary embodiment of the present invention;

FIG. 12c depicts an exemplary response metadata structure associated with the "attractions" category in accordance with one exemplary embodiment of the present invention; and FIG. 12d depicts an exemplary response metadata structure associated with the "wine labels" category in accordance with one exemplary embodiment of the present invention.

DETAILED DESCRIPTION OF EMBODIMENTS

Figure 1:
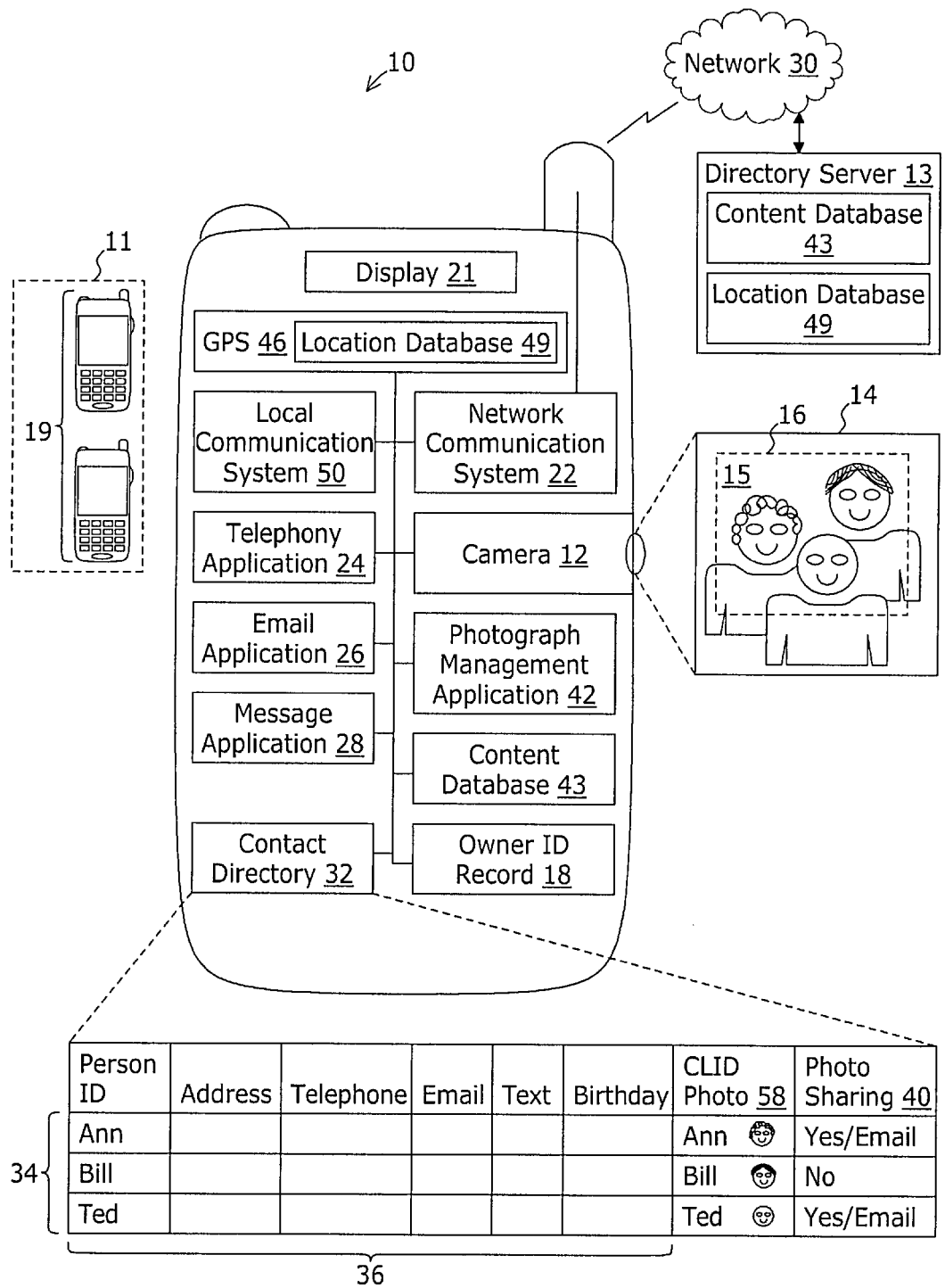
FIG. 1 is a diagram representing an exemplary mobile device implementing a photograph management system in accordance with one embodiment of the present invention.

The term "electronic equipment" as referred to herein includes portable radio communication equipment. The term "portable radio communication equipment", also referred to herein as a "mobile radio terminal" or "mobile device", includes all equipment such as mobile phones, pagers, communicators, e.g., electronic organizers, personal digital assistants (PDAs), smart phones or the like.

Many of the elements discussed in this specification, whether referred to as a "system" a "module" a "circuit" or similar, may be implemented in hardware circuit(s), a processor executing software code, or a combination of a hardware circuit and a processor executing code. As such, the term circuit as used throughout this specification is intended to encompass a hardware circuit (whether discrete elements or an integrated circuit block), a processor executing code, or a combination of a hardware circuit and a processor executing code, or other combinations of the above known to those skilled in the art.

In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

With reference to FIG. 1, an exemplary mobile device 10 is embodied in a mobile telephone, mobile PDA, or other mobile device which may include a network communication system 22 and one of a telephony application 24, an email application 26, and/or a messaging application 28 for communication with other devices over a wide area network 30 with which the network communication system 22 is compatible. In the exemplary embodiment, the wide area network 30 may be any combination of a wireless telephone service provider network, an Internet service provider network, a wide area data network and/or the public Internet.

The mobile device 10 may comprise a contact directory 32 which includes a plurality of contract records 34. Each contact record 34 may include traditional contact information fields 36 such as the person's name, address, telephone number, email address, text message address, birth date, and etc. The contract directory 32 serves its traditional purpose of providing a network address (e.g. telephone number, email address, text address) associated with the person identified in the contact record 34 to enable any of the telephony application 24, email application 26, or messaging application 28 to initiate a communication (message or session) to the network address via the network communication system 22.

Further, each contact record 23 may include a call line identification photograph 58 which is a facial image of the contact. In the exemplary embodiment, the telephony application 24 drives a user interface 21 to display the call line identification photograph 58 when a caller ID signal of an incoming telephone call matches a telephone number in the contact record 34 in which the call line identification photograph 58 is included.

The mobile device 10 further comprises a digital camera system 12 and a photograph management application 42. In general, the digital camera system 12 is used for capturing a digital photograph 14 and the photograph management application 42: i) obtains an information record comprising information related to the digital photograph; and ii) associates at least a portion of the information related to the digital photograph, as text based metadata, with the captured photograph 14. The text based metadata identifies content depicted in the digital photograph 14 such that a collection of photographs can be readily searched and/or sorted based on content (e.g. searched or sorted using the metadata).

Turning briefly to FIG. 2a, it is envisioned that each digital photograph 14 may include primary content 15 within a central, or prominent zone 16. In the example of FIG. 2a, the prominent zone 16 is generally within the center of the digital photograph 14 and the primary content 15 is people (e.g. a plurality of facial images 212a, 212b, and 212c).

Turning briefly to FIG. 2b exemplary metadata 44 associated with a photograph 14 may be structured as an XML record 47. The exemplary XML metadata record 47 may include: i) a date element 51 identifying the date the photograph 14 was taken; ii) a time element 52 identifying time the photograph 14 was taken; iii) location elements 53 identifying the location where the photograph was taken which may include identification of any permutation of GPS latitude/longitude, country, city, and/or other location identification information such as identification of an attraction such as "Disney®"; and iv) primary content elements 54 which includes a category identifier element 55 and, in this example wherein the primary content category is "people", may include, for each person depicted in the photograph 14, a person identification element 56a, 56b, and 56c identifying the person. Further, additional information elements related to the person, such as email address, may also be included. It should be appreciated that an unidentifiable person may be identified in a person identification element as "unidentified" as represented by person identification element 56c.

Figures 3A, 3B:
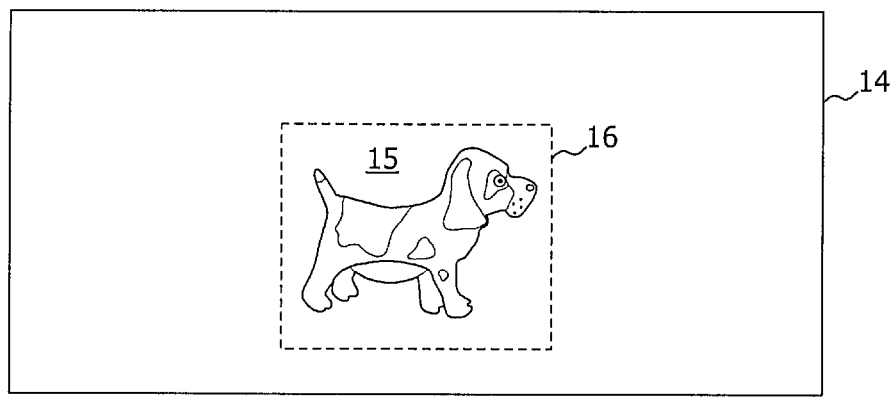
FIG. 3a is a diagram representing an exemplary digital photograph in accordance with one embodiment of the present invention.
FIG. 3b is a diagram representing an exemplary metadata record in accordance with one embodiment of the present invention.

The diagram of FIG. 3a represents an example wherein the digital photograph 14 includes primary contents 15 depicting a dog within the prominent zone 16. Referring briefly to FIG. 3b, an exemplary XML metadata record 47 includes: i) a date element 51 identifying the date the photograph 14 was taken; ii) a time element 52 identifying time the photograph 14 was taken; iii) location elements 53 identifying the location where the photograph was taken; and iv) primary content elements 54 which includes a category identifier element 55 and, in this example wherein the primary content category is "dogs", may include sub data elements 57 further identifying the subject matter within the category of dogs such as breed, dog's name, owner's name.

The diagram of FIG. 4a represents an example wherein the digital photograph 14 includes primary contents 15 depicting an attraction—which may be any of a building, architecture or artistic structure, prominent natural landscape feature, ship, or other object of interest. Referring briefly to FIG. 4b, an exemplary XML metadata record 47 includes: i) a date element 51 identifying the date the photograph 14 was taken; ii) a time element 52 identifying time the photograph 14 was taken; iii) location elements 53 identifying the location where the photograph was taken; and iv) primary content elements 54 which includes a category identifier element 55 and, in this example wherein the primary content category is "attraction" may include sub data elements such an attraction identifier element 218 identifying the attraction and additional information 219 about the attraction such as facts, statistics, and/or a URL for obtaining even more information about the attraction.

The diagram of FIG. 5a represents an example wherein the digital photograph 14 includes primary contents 15 depicting a wine bottle label 220. Referring briefly to FIG. 5b, an exemplary XML metadata record 47 includes: i) a date element 51 identifying the date the photograph 14 was taken; ii) a time element 52 identifying time the photograph 14 was taken; iii) location elements 53 identifying the location where the photograph was taken; and iv) primary content elements 54 which includes a category identifier element 55 and, in this example wherein the primary content category is "wine label" may include vintage data elements 221 which identify the vintage, the vineyard location, awards won by the vintage, and other data that wine connoisseurs may typically desire to know about a vintage.

It should be appreciated that associating the exemplary metadata records 47 depicted in FIGS. 2b, 3b, 4b, and 5b, with each digital photograph within a collection of photographs enables the collection to be readily searched and/or sorted based on content (e.g. searched or sorted using the text based metadata).

Returning to FIG. 1, the photograph management application 42 may obtain the information record for generating each XML metadata record by: i) referencing an internal clock system (not shown) for identifying the date and time at which the digital photograph was taken; and ii) referencing a global positioning system (GPS) 46 to obtain a location at which the digital photograph was taken.

Further, to obtain identification of the location at which the digital photograph was taken in terms of country, state, city, street, region, attraction, or other human recognizable terms, the photograph management application 42 may reference a GPS database 49 which associates GPS coordinates with such human recognizable terms. In one embodiment, the GPS database 49 may be local in the mobile device 10. Alternatively, the GPS database 49 may operated on a remote directory server 13.

For purposes of categorizing the primary contents 15 of a digital photograph 14, the photograph management application 42 may access a primary content database 43 which also be local on the mobile device 10 or operated on a remote directory server 13.

Turning briefly to FIG. 6 an exemplary primary content database 43 may include, for each a plurality of predetermined categories 238, content recognition data 45 for categorizing primary content 15 within one of a plurality of predetermined categories 238 such as people, dogs, attractions, and wine labels. The content recognition data 45 may be in the form of a model photograph to which the image within the prominent zone 16 may be compared. Alternatively the content recognition data 45 may be in the form of feature data representative of the category (e.g. people dogs, attractions, and wine labels) that may be applied to extracted features from the prominent zone 16 to determined to which category the primary content 15 best corresponds.

Returning to FIG. 1, after determining the category of the primary contents 15 of the digital photograph 14, the photograph management application 42 may obtain additional information about the subject matter depicted in the digital photograph 14 (e.g. category specific information about the subject matter) either by accessing data stored by the mobile device 10 or by obtaining such additional information from the directory server 13.

In one particular embodiment, the photograph management application 42 may identify people depicted in the digital photograph 14 by accessing the contact directory 32, and in particular the call line identification photographs 58 of the contact directory 32 for purposes of comparing the image of a person depicted in the digital photograph 14 to the call line identification photographs 58 to identify the person depicted in the digital photograph 14.

Figure 7:
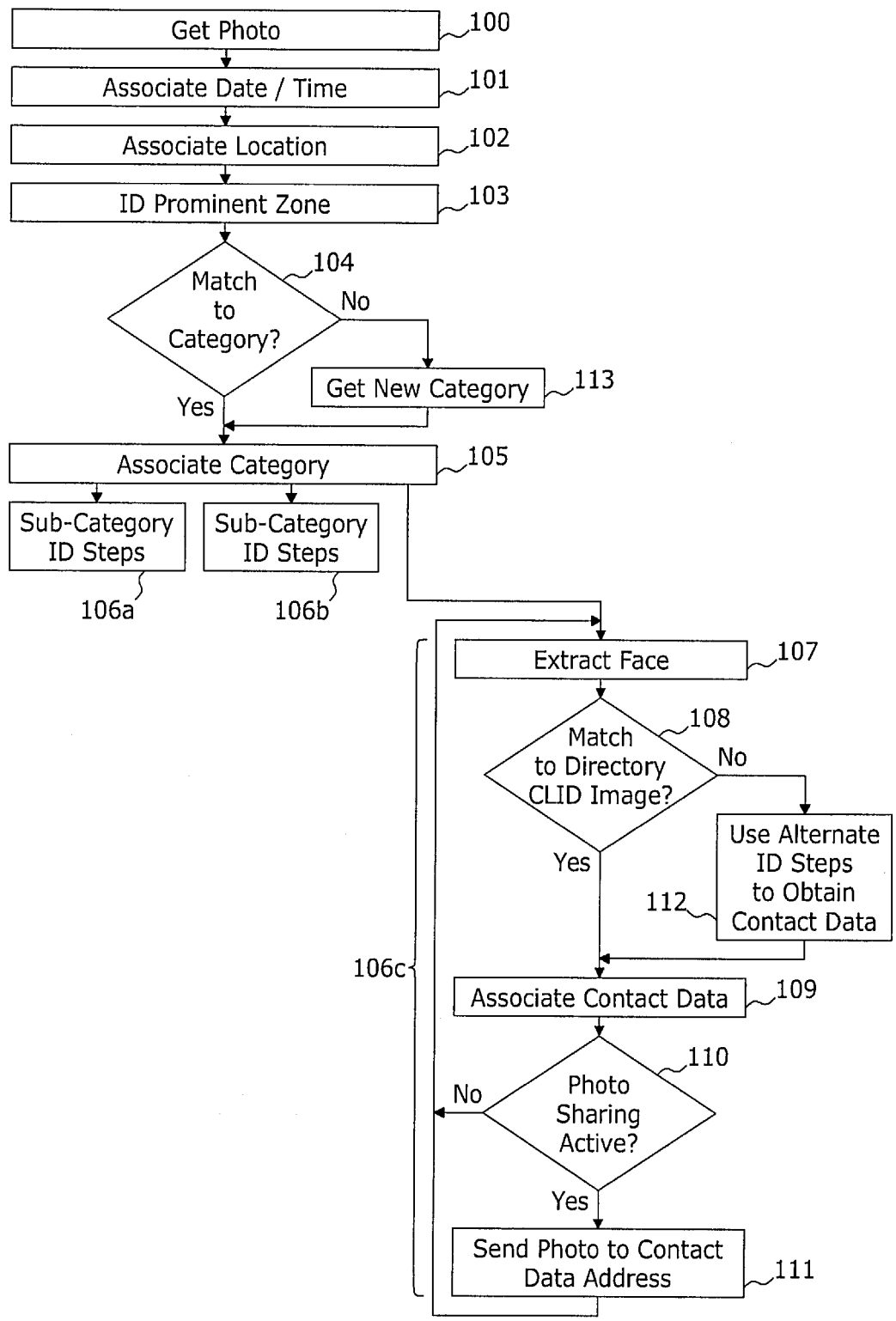
FIG. 7 is a flow chart diagram representing exemplary operation of a photograph management application in accordance with one embodiment of the present invention.

The flow chart of FIG. 7 represents an exemplary aspect of operation of the photograph management application 32 for: i) obtaining an information record comprising information related to a digital photograph; and ii) associating at least a portion of the information record to the digital photograph as an XML metadata record 47 as depicted in any of FIGS. 2b, 3b, 45, and 5b.

Referring to FIG. 7 in conjunction with FIG. 1, step 100 represents receiving the photograph 14 from the camera system 12.

Step 101 represents referencing an internal clock (not shown) to determine the date and time at which the digital photograph 14 was captured and associating such date and time to the digital photograph 14 by writing a date element 51 and a time element 52 to the metadata record 47 (FIG. 2b, 3b, 4b, and 5b) associated with the digital photograph 14.

Step 102 represents associating a location at which the digital photograph 14 was captured with the digital photograph 14 by writing location elements 53 to the metadata record 47. As discussed, the mobile device 10 may include a GPS system 46 which detects signals from GPS satellites and calculates the location (typically longitude, latitude, and elevation) of the mobile device 10 there from. The photograph management application 42 may access the location database 49 (local or remote) to obtain identification of the location in terms of country, state, city, street, street address, prime attraction, or other human recognizable text based data useful for referencing the location. Step 102 represents writing such text based location data to the applicable location elements 53 of the metadata record 47 (FIGS. 2b, 3b, 4b, and 5b) associated with the digital photograph 14.

Step 103 represents identifying the prominent zone 16 wherein the primary content 15 is located. The prominent zone 16 will typically be the center of the photograph 14, but may be offset from the center. If offset, the prominent zone 16 may be recognized by its inclusion of prominent features as opposed to less prominent background.

Step 104 represents categorizing the primary content 15 within the prominent zone 16 by referencing the primary content database 43 (local or remote) to determine to which classification the primary content 15 best corresponds.

As discussed, the primary content database 43 may include content recognition data 45 for classifying primary content 15 within one of a plurality of predetermined categories such as people, buildings, horses, and wine labels. The photograph management application 42 may compare the image within the prominent zone 16 with the content recognition data 45 to determine to which of the predetermined categories the primary content 15 best corresponds.

Further, in the event that a primary content category can not be identified at step 104 (for example the primary contents does not correspond to any of the predetermined categories within the primary content database 43), the photograph management application 32 may drive the user interface 21 to prompt the user to enter a new category at step 113. The text entered by the user to identify the new predetermined category is then added to the primary content database 43 along with data representative of the image (from the digital photograph 14) to use as the model for categorizing contents of future photographs to such category.

The primary content category (either as identified if an existing predetermined category or as entered if a new category) is associated (as metadata) with the photograph 14 which may include writing the category element 55 to the metadata record 47 (FIGS. 2b, 3b, 4b, and 5b).

After categorizing the digital photograph 14, different steps may be associated with each category for obtaining further information about the subject matter for association with the digital photograph.

For example, if the primary content is categorized as "people", the further information may include identification of each of the people depicted in the digital photograph 14 as discussed with reference to FIG. 2b. If the primary content is categorized as "dogs" the further information may include identification of a dog by name, breed, etc as discussed with reference to FIG. 3b. If the primary content is categorized as "attraction", the further information may include identification of the attraction and other information about the attraction as discussed with reference to FIG. 4b. If the primary content is categorized as "wine label" the further information may include vintage data as discussed with reference to FIG. 5b. Steps 106a, 106b, and 106c generically represent performance of category specific steps for obtaining such further information based on the category of the primary content.

Of particular relevance is step 106c which comprises 107 through 111 which are executed for identifying people within a digital photograph 14 when the primary content 15 is categorized as "people". Steps 107 through 111 may be repeated for each person depicted in the prominent zone 16 of a digital photograph 14 to identify each such person.

Step 107 represents extracting a facial image (for example facial image 212a of FIG. 2a) of a person from digital photograph 14.

Step 108 represents the photograph management application 42 comparing the extracted facial image 212a to the call line identification photographs 58 of the contact directory 32 to determine whether the extracted facial image 212a corresponds to an existing contact.

If the extracted facial image 212a matches the call line identification photograph 58 of a record 34, such record may be referred to as the selected contact record. The photograph management application 42 obtains the selected contact record as the information record and associates with the digital photograph 14 at least a portion of the contact information 36 (for example the person's name) from the selected contact record with the photograph 14 at step 109. As discussed with respect to FIG. 2b, this may include writing a person identifier element 56 to the metadata record 47. It is further envisioned that other contact information 36 such as the person's email, phone number, etc may be written to the metadata record 47 with appropriate element tags.

Step 110 represents determining whether photograph sharing is active for the person represented by the contact information associated with the photograph at step 109. Each record 34 of the contact directory 32 may include a photograph sharing indicator 40 identifying a photograph sharing setting as active or inactive. An active setting may be identified by the inclusion of an identification of "email" or a properly formatted "email address" within the field of the photograph sharing indicator 40. If active, the photograph management application 42 initiates a communication, via the network communication system 22 (or a local communication system 50 discussed herein) to a one of the network addresses included in the selected contact record 34 (and identified in the field of the photograph sharing indicator 40) and sends the digital photograph 14 to such network address at step 111. As such, the person depicted in the digital photograph 14 will receive a copy of the digital photograph 14.

Returning to step 108, if the extracted facial image 212a does not match the call line identification photograph 58 of any of the existing contact records 34, alternate identification steps (represented by step 112) may be taken to identify the person and obtain contact information for association with the photograph 14.

Turning briefly to FIG. 8a and FIG. 9a in conjunction with FIG. 1, one exemplary embodiment of alternate identification steps for identifying the person and obtaining contact information may comprise: i) displaying (on display 21) the extracted facial image 212a (as a thumbnail photograph) at step 120; and ii) displaying a listing 150 of a plurality of remote mobile devices 19 within a communication zone 11 defined by the region around the mobile device 10 within which the mobile device 10 may establish a communication session using a local communication system 50 at step 122.

In more detail, the local wireless communication system 50 may be any of a Bluetooth® radio, Infra Red communication module, near field communication (NFC) module or other system for short range communication with another compatible device. The photograph management application 42 drives the local communication system 50 to discover other mobile devices within the communication zone 11 and display the network name, network address, or other identifier of each such device. In the example wherein the local communication system 50 is a Bluetooth radio, the Bluetooth discovery protocols may be used.

Step 124 represents the photograph management application 42 prompting user selection of one of the identified remote mobile device shown in the listing 150 (FIG. 9a). The user may view the extracted facial image, recognize the person as one of the people photographed, and identify the remote mobile device owned by that person depicted in the digital photograph 14 as the selected remote mobile device.

At step 126 the photograph management application 42 initiates communication (either session or messaging) with the selected remote mobile device and obtains a personal contact record (e.g. an electronic business card) from the selected mobile device if the selected mobile device is authorized by its user to deliver the electronic business card. It is also envisioned that the mobile device 10 may also, in return, provide an owner ID record 18 (as an electronic business card) back to the selected mobile device.

The personal contact record may be added to the contact directory 32 as a new contact record 34 (and the extracted facial image 212a added to such new contact record as the call line identification photograph 58) at step 128.

Returning to FIG. 7, step 109 again represents associating at least a portion of the contact information (in this case the information from the new contact record) with the photograph 14 at step 109.

Turning briefly to FIG. 8b in conjunction with FIG. 9b, another exemplary embodiment of alternate steps for obtaining contact information includes displaying the extracted facial image 212a (as a thumbnail photograph) at step 130. In conjunction with the display of the extracted facial image 212a, manual data entry fields 150 may be displayed to prompt a user to select/enter contact information to associate with the person depicted in the extracted facial image 212a at step 132.

Step 134 represents writing the selected/entered contact information to a new contact record 34 of the contact directory 32 and, returning to FIG. 7, step 109 again represents associating the contact information (as manually entered) with the photograph 14 as metadata. Again, the extracted facial image 212a may be added to such new contact record 34 as its call line identification photograph 58.

Figure 10:
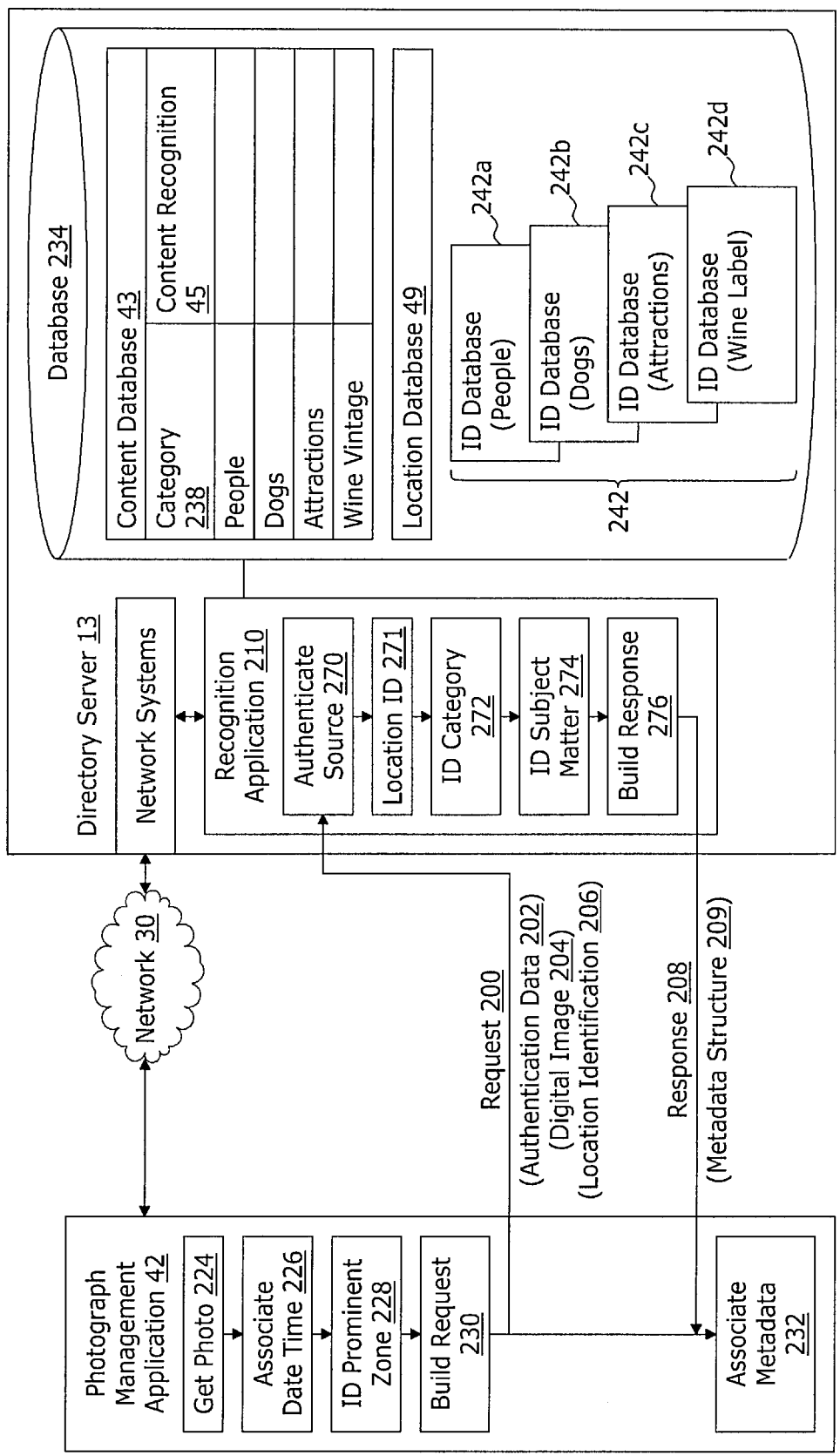
FIG. 10 is a diagram depicting exemplary architecture of an embodiment of the present invention wherein an information record is obtained from a remote directory server.

The diagram of FIG. 10 represents an exemplary aspect of operation of the photograph management application 42 for: i) obtaining an information record comprising information related to a digital photograph; and ii) associating at least a portion of the information record to the digital photograph as an XML metadata record 47 as depicted in any of FIGS. 2b, 3b, 45, and 5b when the information of such information record is provided by a remote directory server 13.

Step 224 represents the photograph management application 42 receiving the photograph 14 from the camera system 12.

Step 226 represents referencing an internal clock (not shown) to determine the date and time at which the digital photograph 14 was captured and associating such date and time to the digital photograph 14 by writing a date element 51 and a time element 52 to the metadata record 47 (FIGS. 2b, 3b, 4b, and 5b) associated with the digital photograph 14.

Step 228 represents identifying the prominent zone 16 wherein the primary content 15 is located. The prominent zone 16 will typically be the center of the photograph 14, but may be offset from the center. If offset, the prominent zone 16 may be recognized by its inclusion of prominent features—as opposed to less prominent background.

Step 230 represents the photograph management application 42 building a request 200 for transfer to the directory server 13. The request 200 may include: i) authentication data 202 for enabling the directory server to identify and authenticate the source of the request 200; and ii) a digital image 204 which comprises at least a portion of a digital photograph 14 embodied in the prominent zone 16. Further, if available, the request 200 may include a location identification 206 which identifies the location at which the photograph was taken (for example a GPS location measured by the device that captured the digital photograph).

In response to receiving the request 200, a recognition application 210 of the directory server 13 returns an information record as a response 208. The information record of the response 208 may be a metadata structure 209 such as an XML record which includes information useful for the photograph management application to populate the metadata record 47 for association with the digital photograph 14 as depicted in FIGS. 2b, 3b, 4b, and 5b.

Returning briefly to FIG. 2a, as a first example, if the digital photograph 14 includes primary contents of people, the request 200 may include, as its digital image 204, the digital photograph 14 or a permutation of one or more extracted facial images 212a, 212b, and 212c—each representing the image of one of the people depicted in the digital photograph 14.

Referring briefly to FIG. 12a, an exemplary XML record 217 which may be returned as a response metadata structure 209 when the category is "people" may include: i) a category identifier element 55 identifying the category as "people"; ii) location elements 53 identifying the location at which the photograph was captured in terms of country, city, state, street address, region, or other human recognizable terms such as "Disney® Park"; and ii) a person ID element 211 for each person (e.g. each facial image included in the digital image 204) that the recognition application 210 is capable of identifying; and ii) for which the identified person has authorized release of identity to the source of the request 200.

The XML record 217 may further include, for each identifiable person: i) an email element 212 identifying the person's email address; and ii) a photograph sharing element 213 identifying whether the person desires to have a copy of the photograph in which he or she is depicted. The photograph sharing element 213 may also include identification of a network address (such as email address) to which the copy of the photograph is to be sent. It is envisioned that the XML record 217 may also include additional elements identifying other personal and/or contact information the identified person has authorized to be disclosed such as telephone number, text message address, etc.

Further, in a situation wherein the digital image(s) 204 include an image of a person that: i) can not be identified by the recognition application 210, or ii) the depicted person has not authorized disclosure of their personal information to the source of the request 200, the XML record 217 may include a data element 215 indicating "unidentified/unauthorized" in place of the person's personal data.

Returning briefly to FIG. 3a as a second example, if the digital photograph 14 includes primary contents of a dog, the request 200 may include, as its digital image 204, the digital photograph 14 or at least the portion of the prominent zone 16 depicting the dog.

Referring briefly to FIG. 12b, an exemplary XML record 217 which may be returned as a response metadata structure 209 when the category is "dogs" may include: i) a category identifier element 55 identifying the category as "dogs"; ii) location elements 53; and iii) sub data elements 57 further identifying the subject matter within the category of dogs such as breed, dog's name, owner's name.

Turning briefly to FIG. 4a in conjunction with FIG. 1, as a third example, if the digital photograph 14 includes primary contents of an attraction such as a ship, building, architecture or artistic structure, or other structure or object of interest, the request 200 may include, as its digital image 204, the digital photograph 14 or at least the portion of the prominent zone 16 depicting the attraction.

Referring briefly to FIG. 12c, an exemplary XML record 217 which may be returned as a response metadata structure 209 when the category is "attractions" may include: i) a category identifier element 55 identifying the category as "attractions"; ii) location elements 53; ii) an attraction identification element 218 identifying the attraction 216 depicted in the digital image 204; and iii) additional information elements 221 about the attraction 216 such as facts, statistics, and a URL for even more information about the attraction.

Turning briefly to FIG. 4a in conjunction with FIG. 1, as a third example, if the digital photograph 14 includes primary contents of a wine bottle label 220, the request 200 may include, as its digital image 204, the digital photograph 14 or at least the portion of the digital photograph depicting the label 220.

Referring briefly to FIG. 12d, an exemplary XML record 217 which may be returned as a metadata structure 209 when the category is "wine labels", may include: i) a category identifier element 55 identifying the category as "wine labels"; ii) location elements 53; iii) a vintage identification element 222 identifying the wine associated with the label 220 and iv) other data elements 224, 226, and 228 about the vintage. The other data elements 224, 226, and 228 may identify such information as: i) a location of the vineyard (data element 224); ii) awards won by the vintage (data element 226); and iii) other useful information about the vintage that wine connoisseurs may typically desire to know (data element(s) 228).

Returning to FIG. 10, after receiving the response 208, the photograph management application 42 associates the information included therein with the digital photograph 14 (as discussed with respect to FIGS. 2b, 3b, 4b, and 5b) at step 232 such that the digital photograph 14 may be included within a collection of digital photographs which may be stored, catalogued, sorted, and/or searched using the metadata associated there with.

To enable the recognition application 210 to provide the metadata structures 209 discussed with respect to FIGS. 12a, 12b, 12c, and 12d, the directory server 13 may include a database 234 for supporting operation of the recognition application 210. In the exemplary embodiment, the database 234 comprises: i) the location database 49 which associates GPS coordinates with location data in human recognizable form; ii) the content database 43 which, as discussed with respect to FIG. 6, associates each of a plurality of categories 238 with content recognition data 45 for determining whether a digital image 204 is within the category; and iii) a plurality of category specific identification level databases 242. In more detail, each category 238 is associated with an identification level database 242 which associates, for the category 238, subject matter within the image category with data about the subject matter.

For example, referring briefly to FIG. 11a, an exemplary identification database 242a associated with the exemplary image category of "people" is shown. The identification database 242a may include a plurality of records 244—each of which is associated with a person. As such, the record associates with the person: i) identification data 246 for recognizing an image of the person; ii) personal information 248 about the person such as the person's name 248a, email address 248b, telephone number 248c, and other data 248d; iii) a photograph sharing indicator 250—which indicates whether the person desires to have a copy of the photograph in which he or she is depicted (including identification of a network address, such as email address, to which the copy of the photograph is to be sent); and iv) group authorization data 252 which identifies a source, category of sources, group of sources, or other criteria for determining whether a source of a request 200 (FIG. 10) is authorized to receive the personal information 248 if the person is depicted in the digital image 204 of such request.

The group authorization data 252 may, for purposes of identifying a source, category of sources, group of sources, or other criteria, identify and/or reference: i) the person's friends/acquaintances/contact list from a social networking web site for purposes of such identification; and/or ii) identify clubs, groups, or organizations, or member lists thereof for purposes of such identification.

Referring to FIG. 11b, an exemplary identification database 242b associated with the exemplary image category of "dogs" is shown. The identification database 242b may include, as an example, records associated with a plurality of breeds 268. Associated with each breed 268 may be: i) identification data 269 for identifying whether an image of a dog depicts the breed; and ii) descriptive data 271 about the breed 268 useful for populating the elements 57 of the XML record discussed with respect to FIG. 12b.

Referring to FIG. 11c, an exemplary identification database 242c associated with the exemplary image category of "attractions" is shown. The identification database 242c may include a plurality of attraction lists 254, each associated with one of a plurality of predetermined locations 256.

Each attraction list 254 includes identification of a plurality of attractions (attraction identifier 255) visible from the predetermined location 256 with which the list 254 associates. Associated with the attraction identifier 255 are identification data 258 for identifying an image of the attraction within a digital image 204 and descriptive data 260 about the attraction.

For example, one of the predetermined locations (location 256a) may include the Disney® Park, Orlando, Fla. (identified in a manner such that the location identification 206 of a request 200 (FIG. 10) may by associated therewith). As such, the attraction list 254 associated with Disney® Park, Orlando, Fla. may identify those attractions in and/or visible from the Disney® Park, Orlando, Fla.—such as the Pirate's Ship. In the example of the Pirate's Ship, the identification data 258 may include characteristic data or image data for identifying an image of the ship. The descriptive data 260 may include any of facts about the ship, statistics, and a URL for obtaining even more information.

Referring to FIG. 11d, an exemplary identification database 242d associated with the exemplary image category of "wine vintage" is shown. The identification database 242d may include a plurality of records 262, each associated with a vintage of wine. Each record 262 associates the vintage with identification data 264 for identifying the vintage's bottle label within a digital image 204 of a request 200 (FIG. 10) and descriptive data 266 about the vintage such as, as discussed with respect to FIG. 4b, vineyard location 224, awards won by the vintage 226, and other useful information 228 about the vintage that wine connoisseurs may typically desire to know.

Returning to FIG. 10, the recognition application 210 typically operates as follows. Upon receipt of the request 200, the recognition application 210 authenticates the source of the request 200 at step 270. In various exemplary embodiments, authentication of the source may include establishing an authenticated TCP/IP session and/or a web services session (e.g. SOAP messaging) and transferring the request 200 therewith.

Step 271 represents referencing the location database 49 to obtain location data for populating location elements 53 (in human recognizable terms) into the exemplary metadata structures discussed with respect to FIGS. 12a, 12b, 12c, and 12d.

Step 272 represents determining a selected image category of the digital image 204 of the request 200 by applying the content recognition data 45 of the content database 236 to the digital image 204 to determine a selected image category. The selected image category is the image category 238 to which the digital image 204 corresponds. As discussed, this may include comparing the features of the digital image 204 to the features of the content recognition data 45 of each category 238 to determine the category of the digital image 204.

Step 274 represents comparing the digital image 204 of the request 200 to the subject matter within the identification database 242 associated with the selected image category to: i) determine selected subject matter; and ii) obtain selected information about the selected subject matter. The selected subject matter is the subject matter with which the digital image corresponds (e.g. the subject matter depicted in the digital image 14). The selected information is the information used to build the response metadata structure 209 discussed with respect to FIGS. 12a, 12b, 12c, and 12d.

For example, if at step 272, the category is determined to be "people", then at step 274 the digital image 204 is compared to the identification data 246 of each record 244 of the identification database 242a (FIG. 11a) to identify the person(s) depicted in the digital image 204. The selected information may be at least a portion of the personal information 248 of the record 244 associated with the identified person.

As another example, if at step 272 the category is determined to be "dogs", then at step 274 the digital image 204 is compared to the ID data 269 for each breed 268 to determine the breed of the dog depicted in the digital image 204. The selected information may be at least a portion of the descriptive data 271 associated with the identified breed.

As yet another example, if at step 272, the category is determined to be "attractions", then at step 274 the digital image 204 is compared to the identification data 258 in the attraction list 254 corresponding to the predetermined location 256 that corresponds to the location identification 206 of the request to identify the attraction depicted in the digital image 204. The selected information may be at least apportion of the descriptive data 260 associated with the identified attraction 255.

As yet another example, if at step 272 the category is determined to be "wine labels", then at step 274 the digital image 204 is compared to the identification data 264 for each vintage to determine the vintage of wine with which the label 220 (FIG. 5a) depicted in the image 204 corresponds. The selected information may be at least a portion of the descriptive data 266 associated with such vintage.

In all of the above examples, step 276 represents building the response metadata structure and initiating its return to the photograph management application 42 as the response 208 to its request.

Although the invention has been shown and described with respect to certain preferred embodiments, it is obvious that equivalents and modifications will occur to others skilled in the art upon the reading and understanding of the specification. As one example, the metadata structure represented in FIGS. 2a, 2b, 2c, and 2d are represented as an XML record. Such representation is exemplary only and not intended to limit the scope of the invention as described in the appended claims. Those skilled in the art will recognize that other equivalent metadata structures exist and the selection of any particular data structure for associating metadata describing the contents of a digital photograph with the digital photograph is a matter of design choice.

As a second example, the flow chart of FIG. 7 depicts an exemplary embodiment wherein the information record for association with a digital photograph is obtained from sources of information local to the mobile device and the diagram of FIG. 10 depicts an exemplary embodiment wherein the information record (or at least the primary content portion of an information record) is obtained from a remote directory server. Those skilled in the art will recognize that combinations of obtaining a portion of the information record (such as category) from local data sources and obtaining a portion of the information record from a remote server is a matter of design choice. For example it is envisioned the local sources may be used for determining that a digital photograph is within the category of people and remote sources may be used for identifying multiple people depicted in the photograph. However, additional people depicted in the digital photograph may be identified by the directory server.

As yet a third example, the diagram of FIG. 10 represents the directory server interacting with the photograph management application of the mobile device as the client generating the request to the directory server. Those skilled in the art will recognize that the directory server may also receive requests from, and provide responses to, any of a traditional photo album application operating on a traditional desk top or notebook computer.

The present invention includes all such equivalents and modifications, and is limited only by the scope of the following claims.

The invention claimed is:

1. A server for providing an information record comprising selected information related to a digital image depicted in a digital photograph, the server comprising:
    a database storing, in association with each of a plurality of subject matters:
        recognition data comprising a preset text-based data record pertaining to the subject matter and that is not associated with a digital image for recognizing the subject matter; and
        an information record independent of a digital image and containing information related to the subject matter and having a data structure for populating a non-image data record relating to the subject matter; and
    a recognition application for:
        receiving a request from a remote client system, the request comprising a digital image;
        applying the recognition data to the digital image to determine a selected subject matter, the selected subject matter being the subject matter depicted in the digital image;
        obtaining selected information from the database, the selected information being the information record related to the selected subject matter; and
        returning a response to the remote client system, the response comprising the information record comprising the selected information, wherein the information record is associated with the digital photograph.

2. The server of claim 1, wherein:
    the database comprises a person identification database, the person identification database associating, for each of a plurality of persons:
        identification data for recognizing an image of the person; and
        personal information about the person, the personal information comprising the person's name;
    applying the recognition data to the digital image to determine a selected subject matter comprises comparing a facial image of the digital image with the identification data to identify a selected person, the selected person being the one of the plurality of persons who's image is depicted within the digital image; and
    obtaining selected information from the database comprises obtaining the personal information about the person.

3. The server of claim 2, wherein the personal information about the person further comprises the person's contact information.

4. The server of claim 2, wherein:
    the person identification database further associates each of the plurality of persons with identification of a group authorized to receive the personal information about the person;
    the request comprises authentication data identifying a source of the request; and
    the server only returns the personal information associated with the selected person if the source of the request is within the group authorized to receive personal information about the selected person.

5. The server of claim 2, wherein:
    the person identification database further associates each of the plurality of persons with a photograph sharing request indicator identifying whether the person desires to obtain a photograph in which he/she is depicted;
    the response further comprises the photograph sharing request indicator associated with the selected person; and
    the personal information includes a network address to which the selected person desires the photograph in which he/she is depicted to be sent.

6. The server of claim 1, wherein:
    the request further identifies a photograph location, the photograph location being a location at which the digital image was captured;
    the database comprises an attraction database, the attraction database associating, for each of a plurality of predetermined locations:
        identification data for recognizing each of a plurality of attractions visible from the predetermined location; and
        descriptive data about each of the plurality of attractions visible from the predetermined location;
    applying the recognition data to the digital image to determine a selected subject matter comprises:
        determining a selected predetermined location, the selected predetermined location being the predetermined location corresponding to the photograph location;
        comparing the digital image with identification data for the attractions visible from the selected predetermined location to determine a selected attraction, the selected attraction being the one of the plurality of attractions visible from the predetermined location and depicted in the digital image; and
    obtaining selected information from the database comprises obtaining descriptive data associated with the selected attraction.

7. The server of claim 1, wherein:
    the database comprises a wine label database, the wine label database associating each of a plurality of vintages of wine with:
        data for recognizing an image of a label associated with the vintage of wine; and
        information about the vintage of wine;
    applying the recognition data to the digital image to determine a selected subject matter comprises comparing the digital image with data for recognizing an image of a label to identify a selected vintage, the selected vintage being the one of the plurality of vintages associated with a label depicted in the digital image; and the data about the subject matter includes the information about the selected vintage.

8. The server of claim 1, wherein:

the database comprises:

a categorization level database associating each of a plurality of image categories with content recognition data for determining whether the digital image is within the image category;

an identification level database associating, with each image category, subject matter within the image category with data about the subject matter;

applying recognition data to the digital image to determine selected subject matter comprises:

comparing the digital image with the content recognition data to determine a selected image category, the selected image category being the image category with content recognition data with which the digital image corresponds;

comparing the digital image with subject matter within the selected image category to determine a selected subject matter, the selected subject matter being the subject matter depicted in the digital image; and obtaining selected information from the database comprises obtaining the data about the selected subject matter.

9. The server of claim 8, wherein:

one of the image categories is a people image category;

the identification level database includes a person identification database associated with the people image category, the person identification database associates, for each of a plurality of persons, identification data for recognizing an image of the person with personal information about the person, the personal information comprising the person's name and contact information;

comparing the digital image with subject matter within the selected image category comprises comparing a facial image of the digital image with the identification data of the person identification database to identify a selected person, the selected person being the one of the plurality of persons who's image is recognized within the digital image; and the data about the selected subject matter includes the personal information associated with the selected person.

10. The server of claim 9, wherein:

the person identification database further associates each of the plurality of persons with identification of a group authorized to receive the personal information about the person;

the request comprising authentication data identifying a source of the request; and the server only returns the personal information associated with the selected person if the source of the request is within the group authorized to receive personal information about the selected person.

11. The server of claim 9, wherein:

the person identification database further associates each of the plurality of persons with a photograph sharing request indicator identifying whether the person desires to obtain a photograph in which he/she is depicted;

the response further comprises the photograph sharing request indicator associated with the selected person; and the personal information includes a network address to which the selected person desires the photograph in which he/she is depicted to be sent.

12. The server of claim 8, wherein:

one of the image categories is an attraction image category;

the request further identifies a photograph location, the photograph location being a location at which the digital image was captured;

the identification level database includes an attraction database associated with the attraction image category, the attraction database associates, for each of a plurality of predetermined locations:

identification data for recognizing each of a plurality of attractions visible from the predetermined location; and descriptive data about each of the plurality of attractions visible from the predetermined location;

comparing the digital image with subject matter within the selected image category comprises:

determining a selected predetermined location, the selected predetermined location being the predetermined location corresponding to the photograph location;

comparing the digital image with identification data for the attractions visible from the selected predetermined location to determine a selected attraction, the selected attraction being the one of the plurality of attractions visible from the predetermined location recognized within the digital image; and the data about the selected subject matter includes descriptive data associated with the selected attraction.

13. The server of claim 8, wherein:

one of the image categories is a wine label image category;

the identification level database includes a wine label database associated with the wine label image category, the wine label database associates each of a plurality of vintages of wine with:

data for recognizing an image of a label associated with the vintage of wine; and information about the vintage of wine;

comparing the digital image with subject matter within the selected image category comprises comparing the digital image with data for recognizing an image of a label to identify a selected vintage, the selected vintage being the one of the plurality of vintages associated with a label with which the digital image corresponds; and the data about the subject matter includes the information about the selected vintage.

14. A method of operating server for providing an information record comprising selected information related to a digital image depicted in a digital photograph, the method comprising:

maintaining a database storing, in association with each of a plurality of subject matters:

recognition data comprising a preset text-based data record pertaining to the subject matter and that is not associated with a digital image for recognizing the subject matter; and an information record independent of a digital image and containing information related to the subject matter and having a data structure for populating a non-image data record relating to the subject matter;

receiving a request from a remote client system, the request comprising a digital image;

applying the recognition data to the digital image to determine a selected subject matter, the selected subject matter being the subject matter depicted in the digital image;

obtaining selected information from the database, the selected information being the information record related to the selected subject matter; and returning a response to the remote client system, the response comprising the information record comprising the selected information, wherein the information record is associated with the digital photograph.

15. The method of claim 14, wherein:
the database comprises a person identification database, the person identification database associating, for each of a plurality of persons:
  identification data for recognizing an image of the person; and
  personal information about the person, the personal information comprising the person's name;
applying the recognition data to the digital image to determine a selected subject matter comprises comparing a facial image of the digital image with the identification data to identify a selected person, the selected person being the one of the plurality of person's who's image is depicted within the digital image; and
obtaining selected information from the database comprises obtaining the personal information about the person.

16. The method of claim 15, wherein the personal information about the person further comprises the person's contact information.

17. The method of claim 15, wherein:
the person identification database further associates each of the plurality of persons with identification of a group authorized to receive the personal information about the person;
the request comprises authentication data identifying a source of the request; and
the server only returns the personal information associated with the selected person if the source of the request is within the group authorized to receive personal information about the selected person.

18. The method of claim 15, wherein:
the person identification database further associates each of the plurality of persons with a photograph sharing request indicator identifying whether the person desires to obtain a photograph in which he/she is depicted;
the response further comprises the photograph sharing request indicator associated with the selected person; and
the personal information includes a network address to which the selected person desires the photograph in which he/she is depicted to be sent.

19. The method of claim 14, wherein:
the request further identifies a photograph location, the photograph location being a location at which the digital image was captured;
the database comprises an attraction database, the attraction database associating, for each of a plurality of predetermined locations:
  identification data for recognizing each of a plurality of attractions visible from the predetermined location; and
  descriptive data about each of the plurality of attractions visible from the predetermined location;
applying the recognition data to the digital image to determine a selected subject matter comprises:
  determining a selected predetermined location, the selected predetermined location being the predetermined location corresponding to the photograph location;
  comparing the digital image with identification data for the attractions visible from the selected predetermined location to determine a selected attraction, the selected attraction being the one of the plurality of attractions visible from the predetermined location and depicted in the digital image; and
obtaining selected information from the database comprises obtaining descriptive data associated with the selected attraction.

20. The method of claim 14, wherein:
the database comprises a wine label database, the wine label database associating each of a plurality of vintages of wine with:
  data for recognizing an image of a label associated with the vintage of wine; and
  information about the vintage of wine;
applying the recognition data to the digital image to determine a selected subject matter comprises comparing the digital image with data for recognizing an image of a label to identify a selected vintage, the selected vintage being the one of the plurality of vintages associated with a label depicted in the digital image; and
the data about the subject matter includes the information about the selected vintage.

21. A method of operating a server for identifying selected information in an information record for association with a digital photograph, the method comprising:
receiving a request from a remote client system, the request comprising a digital image;
comparing the digital image with content recognition data comprising a preset text-based data record that is not associated with the digital image and pertaining to subject matter from a categorization level database to determine a selected image category,
  the categorization level database associating each of a plurality of image categories with content recognition data for determining whether the digital image is within the image category; and
  the selected image category being the image category with content recognition data with which the digital image corresponds;
comparing the digital image with subject matter from an identification level database associated with the selected image category to determine a selected subject matter,
  the identification level database associating, with the image category, subject matter within the image category with data about the subject matter; and
  the selected subject matter being the subject matter with which the digital image; and
generating a response to the remote client system, the response comprising the information record containing data about the selected subject matter, wherein the information record has a data structure for populating a non-image data record relating to the selected subject matter depicted in the digital photograph.

22. The method of claim 21, wherein:
one of the image categories is a people image category;
the identification level database includes a person identification database associated with the people image category, the person identification database associates, for each of a plurality of persons, identification data for recognizing an image of the person with personal information about the person, the personal information comprising the person's name and contact information;
comparing the digital image with subject matter from an identification level database within the selected image category comprises comparing a facial image of the digital image with the identification data of the person identification database to identify a selected person, the selected person being the one of the plurality of persons who's image is recognized within the digital image; and the data about the selected subject matter includes the personal information associated with the selected person.

23. The method of claim 22, wherein:

the person identification database further associates each of the plurality of persons with identification of a group authorized to receive the personal information about the person;

the request comprising authentication data identifying a source of the request; and the server only returns the personal information associated with the selected person if the source of the request is within the group authorized to receive personal information about the selected person.

24. The method of claim 22, wherein:

the person identification database further associates each of the plurality of persons with a photograph sharing request indicator identifying whether the person desires to obtain a photograph in which he/she is depicted;

and the response further comprises the photograph sharing request indicator associated with the selected person; and the personal information includes a network address to which the selected person desires the photograph in which he/she is depicted to be sent.

25. The method of claim 21, wherein:

one of the image categories is an attraction image category;

the request further identifies a photograph location, the photograph location being a location at which the digital image was captured;

the identification level database includes an attraction database associated with the attraction image category, the attraction database associates, for each of a plurality of predetermined locations:

identification data for recognizing each of a plurality of attractions visible from the predetermined location; and descriptive data about each of the plurality of attractions visible from the predetermined location;

comparing the digital image with subject matter within the selected image category comprises:

determining a selected predetermined location, the selected predetermined location being the predetermined location corresponding to the photograph location;

comparing the digital image with identification data for the attractions visible from the selected predetermined location to determine a selected attraction, the selected attraction being the one of the plurality of attractions visible from the predetermined location recognized within the digital image; and the data about the selected subject matter includes descriptive data associated with the selected attraction.

26. The method of claim 21, wherein:

one of the image categories is a wine label image category;

the identification level database includes a wine label database associated with the wine label image category, the wine label database associates each of a plurality of vintages of wine with:

data for recognizing an image of a label associated with the vintage of wine; and information about the vintage of wine;

comparing the digital image with subject matter within the selected image category comprises comparing the digital image with data for recognizing an image of a label to identify a selected vintage, the selected vintage being the one of the plurality of vintages associated with a label with which the digital image corresponds; and the data about the subject matter includes the information about the selected vintage.

\* \* \* \* \*